United States Patent
Blass et al.

[11] Patent Number: 6,066,364
[45] Date of Patent: May 23, 2000

[54] METHOD OF PRODUCING A LAYER ON A POROUS SUBSTRATE

[75] Inventors: Günter Blass, Eschweiler; Dieter Mans, Waldfeucht; Gottfried Bollig, Bergheim; Rüdiger Förthmann, Roetgen; Hans-P. Buchkremer, Heinsberg, all of Germany

[73] Assignee: Forschungszentrum Jülich GmbH, Jülich, Germany

[21] Appl. No.: 09/149,604

[22] Filed: Sep. 8, 1998

Related U.S. Application Data

[63] Continuation-in-part of application No. PCT/DE97/00455, Mar. 8, 1997.

[30] Foreign Application Priority Data

Mar. 11, 1996 [DE] Germany .............. 196 09 418

[51] Int. Cl.$^7$ .................. B05D 1/12; B05D 3/02
[52] U.S. Cl. .................. 427/201; 427/115; 427/190; 427/126.3; 427/294; 427/376.1
[58] Field of Search ................. 427/126.3, 189, 427/190, 201, 226, 294, 295, 375, 376.1, 115

[56] References Cited

U.S. PATENT DOCUMENTS

| | | | |
|---|---|---|---|
| H971 | 10/1991 | Leonard | 428/457 |
| 4,555,453 | 11/1985 | Appleby | 429/41 |
| 4,746,341 | 5/1988 | Komoda | 55/487 |
| 4,888,114 | 12/1989 | Gaddis et al. | 210/500.25 |
| 5,308,494 | 5/1994 | Brandon et al. | 210/639 |
| 5,332,597 | 7/1994 | Carolan et al. | 427/243 |
| 5,464,654 | 11/1995 | Mizuno | 427/123 |

*Primary Examiner*—Shrive Beck
*Assistant Examiner*—Michael Barr
*Attorney, Agent, or Firm*—Klaus J. Bach

[57] ABSTRACT

In a method of producing a layer on a porous substrate, a suspension including coarse solids of such a size that they clog the pores of the substrate and fine solids which are not larger than 1/5 of the coarse solids is poured onto the porous substrate and the substrate with the layer of solids disposed thereon is then dried and sintered.

6 Claims, 2 Drawing Sheets

METHOD OF PRODUCING A LAYER ON A POROUS SUBSTRATE

This is a Continuation-in-part application of pending international application PCT/DE97/00455 filed Mar. 8, 1997 and claiming the priority if the German application 196 09 418.6 filed on Mar. 11, 1996.

BACKGROUND OF THE INVENTION

The invention relates to a method of coating a porous substrate with a thin electrolyte layer, particularly a method of coating porous electrodes with thin electrolyte layers. Such electrodes are used mainly in connection with high temperature fuel cells.

DE 44 37 105 and DE 195 20 458 disclose electrode/electrolyte units with thin electrolyte layers of 20 μm which are manufactured by electrophoresis. However, it has been found that, with electrophoresis, only substrates with a certain pore size distribution can be used. Particularly, electrodes which have been made in accordance with the Coat-Mix-process as it is known from DE 33 05 530 and from DE 33 05 529 could not be coated over large areas by the electrophoresis process. The reasons herefor were the large pores which occur in electrodes made by the Coat-Mix process. Electrodes with large pores insure a fast gas exchange in a high temperature fuel cell. It is therefore desirable to maintain a high level of porosity.

It is also known to cast foils for the manufacture of electrolyte layers. For this process, however, large and expensive foil casting tables are required.

It is the object of the present invention to provide a simple coating process by which large-pore substrates can be coated with a thin layer.

SUMMARY OF THE INVENTION

In a method of producing a layer on a porous substrate, a suspension including coarse solids of such a size that they clog the pores of the substrate and fine solids which are not larger than ⅕ of the coarse solids is poured onto the porous substrate and the substrate with the layer of solids disposed thereon is then dried and sintered.

The solid particles are contained in a suspension which is poured onto the substrate surface to be coated. Depending on the desired application, the suspension may contain metallic ceramic or mixed solid particles. The solvent escapes through the pores. The solid particles remain on the substrate surface. The substrate with the solid particles disposed thereon is first dried and then sintered to form the end product.

If the suspension contains, for example, $ZrO_2$+8 mol % $Y_2O_3$ (YSZ=Yttrium Stabilized Zirconia) a gas-tight layer is formed on the substrate. In a high temperature fuel cell, this layer can act as an electrolyte layer. If the suspension includes additionally parts of NiO, a porous surface layer is formed on the substrate which has pores of a relatively small size as compared to pores with respect to pore sizes typically present in electrodes of of high temperature fuel cells. If in this layer NiO is reduced to Ni, additional pores are formed. A layer made in this way may be used for example as a thin catalytically active functional layer of an anode. It then contains, for example, 60 vol % YSZ and 40 Vol % NiO-parts. In accordance with the method, for example, a YSZ layer can then be deposited on this porous functional layer which acts as an electrolyte.

The substrate is preferably formed as the bottom of a dross mold. In this way, it is prevented that a part of the suspension flows off to the side whereby part of the material would be lost. In contrast to the conventional dross castings, the bottom of the dross mold is not separated from the cast ceramic layer after casting but remains firmly connected thereto. The substrate may therefore be provided with a mask so that a kind of container is formed thereby. The substrate side to be coated forms the bottom of the container. The suspension is then filled into the container. Suspensions as they are known from DE 44 37 104 and from DE 195 20 458 for the manufacture of an electrode with a thin electrolyte layer disposed thereon may be used for that purpose.

It is advantageous if the suspension includes particle components whose diameters are such that the pores of the substrates, or respectively, the electrode are blocked or clogged (coarse parts). In this way, the solid particles in the suspension whose diameter is smaller than that of the pores of the substrate cannot flow through the pores in the substrate and therefore remain useful. Also, in this way, a form engagement between the substrate and the layer is achieved since part of the particles enters the pores of the substrate. This engagement causes a mechanically very stable interconnection between the substrate and the cover layer. Such a firm engagement is for example particularly advantageous if the substrate—cover layer unit is subjected to large temperature changes. Consequently, the interconnection must be able to withstand thermal tensions. Such thermal tensions occur for example in high temperature fuel cells.

In an optimal case, the suspension contains for that purpose solid particles whose maximum diameter equals the diameter of the smallest pores in the electrode. Then a particularly good engagement and mechanical interconnection is obtained. Also, the sintering behavior is better the smaller the particles in the suspension are. The diameter of the coarse particles is also for this reason preferably minimized in an advantageus manner.

Preferably, the coarse particle content of the suspension is minimized. That is it is selected sufficiently large to close the pores but not so large that a layer of coarse particles can build up on the substrate. A 3 to 10% coarse particle content was found to be sufficient depending on the substrate.

The diameter of the coarse particles is preferably in the range of 3–4 μm if substrates or electrodes are to be coated which are for use in high temperature fuel cells. These sizes are typical for such applications. The porosity is typically in the range of 45–48%. The pore size is then about 5±2 μm.

Preferably, the suspension includes particles whose diameter is one fifth specifically one eighth to one twelfth of that of the particles adapted to close the pores (fine particle content).

The fine particles have a diameter range of 0.3–0.4 μm if coarse particles of 3–4 μm are provided.

When the layer is applied to the substrate, the coarse particles sink faster to the substrate surface than the fine particles and close the pores. Subsequently, the fine particles precipitate onto the coarse particles.

A fine particle content is desirable since the fine particles have a better sintering behavior than the coarse particles. It has been found that suitable electrode-electrolyte units for high temperature fuel cells can be easily manufactured in this way.

Preferably, a vacuum is established at the side of the substrate or electrode opposite the side on which the particles are deposited. In this way, the solvent present in the suspension is fully removed during the application of the cover layer. Only the particles which were contained in the suspension are deposited on the substrate or the electrode.

Also, in this way, a good connection of the particles to the substrate or, respectively, the electrode is insured. After the deposition of the particles on the substrate or the electrode, the unit is dried in air. It has been found that this procedure was free of problems as no cracks developed during drying. In this respect, the method has substantial advantages over the electrophoresis process. Electrolyte layers manufactured by way of electrophoresis tend to develop cracks during drying.

The product is further processed in accordance with the manufacturing steps known from the electrophoresis process to provide the final product.

The casting method according to the invention has the following advantages:

dense layers with layer thicknesses of between 0.5 $\mu$m and 200 $\mu$m can be produced.

The layer thickness can be accurately adjusted by way of the solids content of the suspension and the substrate size.

A good and seamless connection between the substrate and the electrolyte layer and as a result, a firm attachment of the electrolyte layer to the substrate can is obtained.

There are only minor suspension losses during the coating procedure.

Large cast layer areas can be dried without problems.

Clean and dust-free operation can be established in a relatively simple manner.

Disadvantages of the process are:

Very thick layers cannot be produced. The upper limit for the thickness of the layers produced has been about 200 $\mu$m.

The pore size of the substrate is limited toward the low end: If the pores are too small the solvent cannot pass through the substrate.

DESCRIPTION OF PREFERRED EMBODIMENTS

Figure 1:
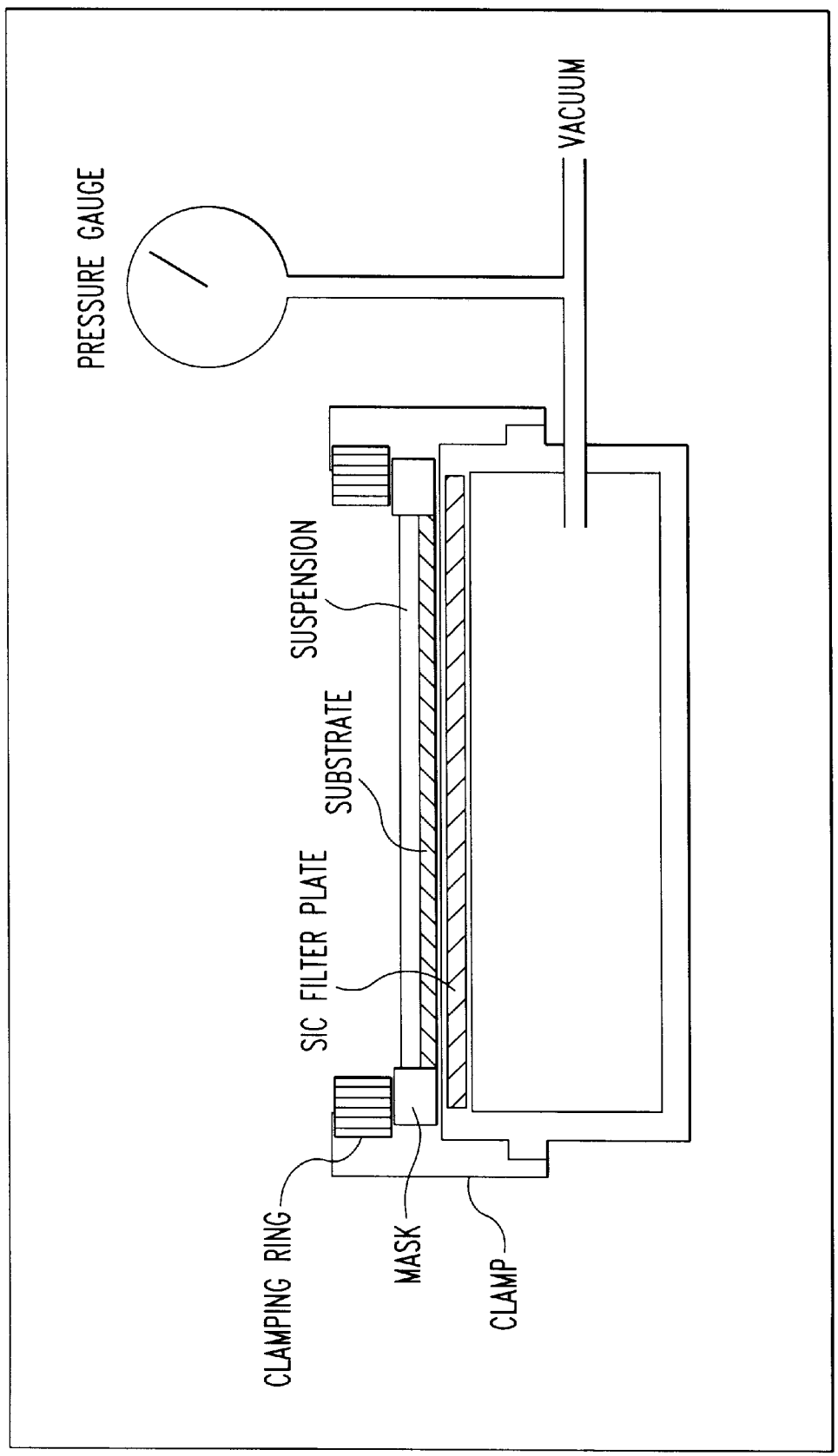
FIG. 1 is a schematic representation of an apparatus for applying a layer to a 100 mm×100 mm substrate.

Two apparatus were built which are suitable for the coating of square substrates of a size of 100 mm×100 mm (see FIG. 1) and 250 mm×250 mm (final dimension).

First YSZ suspensions in accordance with the provisions for the preparation of suspensions for the electrophoretic deposition were prepared:

1. Preparation of the base powder:

Calcining of the YSZ powder: (Two Al$_2$O$_3$ pans with 2 kg each of YSZ-powder at room temperature were heated at a heating rate of 3° K./min to 1200° C. After 3 hrs, the pans with contents were again cooled to room temperature.

Storage (problem free).

2. Crushing and dispersing:

Introduction, by weight, into a 1 liter polyethylene wide opening bottle (200 g calcined YSZ powder, 600 g (765 ml) ethanol absolute, 600 g 3 mm grinding balls (partially stabilized zirconium dioxide with 3% yttrium: TZ-3Y) 600 g 5 mm grinding balls (TZ-3Y) (TZ partially stabilized zirconium oxide).

grinding (48 h on a roller bank (speed stage 3–4))

Addition, by weight, in 1 liter PE (polyethylene) wide opening bottle (3.9–4.0 g polyethylenimine (PEI)-solution).

Sedimentation (40 h (the non-disposed part settles)).

After 40 h sedimentation, the suspension is separated from the sediment simply by pouring. The sediment is rejected. Then the solids content is determined gravimetrically in an aliguot part. For this purpose, 1 ml suspension is metered into an annealed and weighed CaSZ pan (CaSZ= calcium stabilized zirconium dioxide), dried under air at 80° C. in a drying containment the annealed for three hours 1050° C. in a muffle furnace and the again weighed. The weight difference represents the YSZ content per ml suspension. The solids content should be about 40 g/l.

Figure 2:
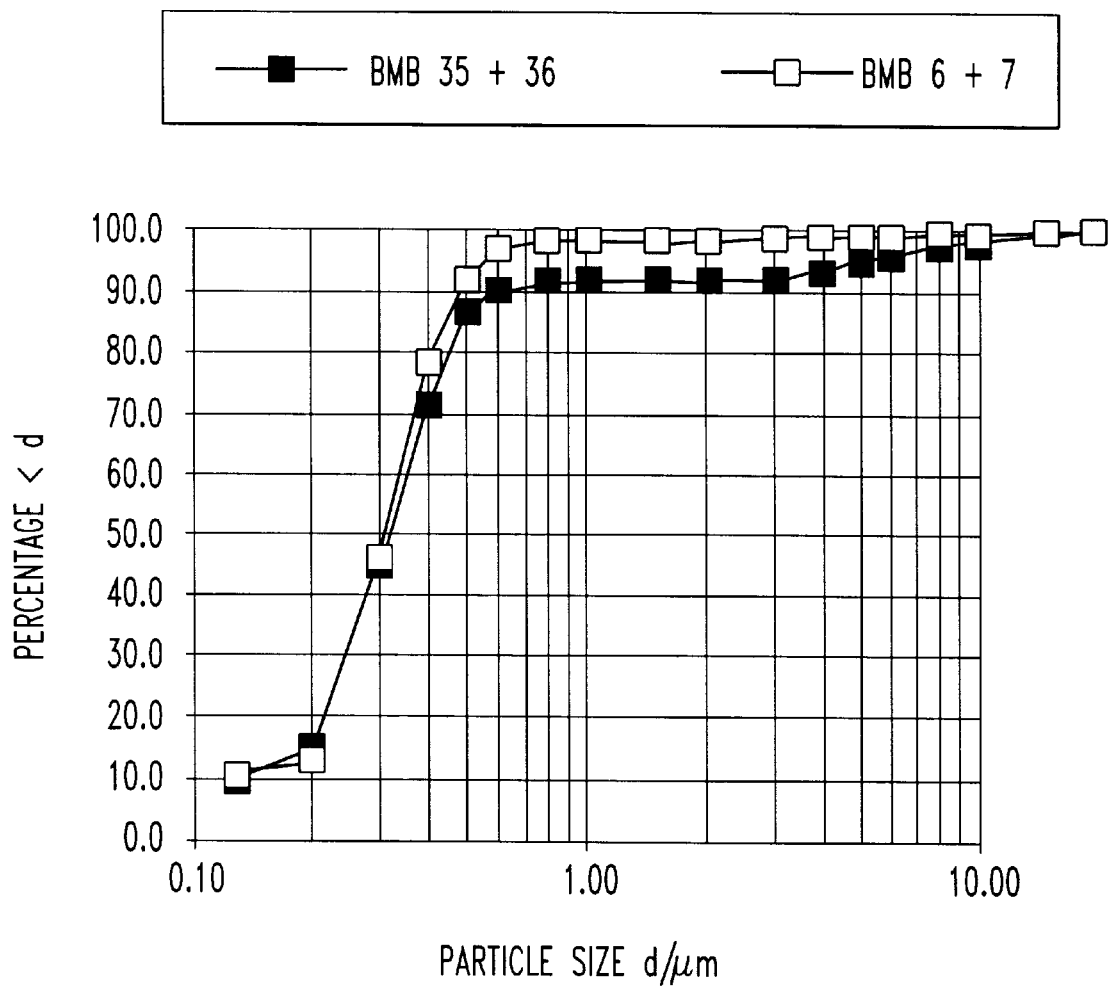
FIG. 2 shows the particle size distributions of the suspensions which were used BMB 6+7 and 34+35.

With a small sample of the suspension, the particle size distribution is determined using the Particle Size Analyzer SA-CP3 of the company SHIMADZU. The average particle size (median value) is about 0.3 $\mu$m. Two typical particle size distributions are shown in FIG. 2.

Suspensions containing about 3–5% coarse particles have-been found to be particularly good (see suspension BMB 34+35).

After the preliminary sintering, the weight of the substrates is determined. Proper cleaning and preparation of the anode substrates is very important for the quality of the layers, that is, the substrates must be stored free of dust and clean and should be handled only with latex gloves.

The pre-cleaned substrate plate is checked optically under a microscope for an acceptable surface and undamaged corners and edges. Then, it is tested with the fingernail to insure, that it is free of cracks. Imperfect substrates are rejected. Subsequently, the substrate is saturated with ethanol, its underside is marked and the substrate is placed with the marked underside onto the filter plate of the apparatus. The edges are sealed with an appropriate silicon rubber material so as to form a frame-like mask. The dimensions of the mask should be only about 0.5 mm smaller than the substrate so that it is disposed closely adjacent the edges and seals well. Then the mask is firmly engaged with the substrate by a PVC clamping ring. Care has to be taken that the silicon rubber mask is pressed into tight engagement with the substrate so that the suspension cannot be sucked out between the seal and the substrate. Then the substrate plate is leveled by adjusting the adjustable support table. The substrate is then cleaned from any dust particles by compressed air and the apparatus is then immediately closed by a cover and is only opened for pouring the suspension onto the substrate and for removing the finished coated plate.

A suspension volume calculated corresponding to the plate (substrate) size, the desired layer thickness and the solids content of the suspension is then immediately applied to the substrate (V=dF$\rho$/c, wherein V=volume of suspension (ml), d=thickness of the electrolyte layer (cm), F=surface area of the substrate(cm$^2$), $\rho$=density of the electrode layer (g×cm$^{-3}$) and c=solid particle concentration of the suspension (g/ml)). Then the vacuum pump is switched on and, in a stepwise fashion, a low pressure is applied of first 100, then about 150 up to maximally 300 Torr. The solvent of the suspension is suctioned thereby through the pores of the substrate. By visual checking, it is made sure that the suspension does not escape at the sides between the substrate and the seal. If this should happen, the sample has to be rejected.

After maximally 20 minutes, all the ethanol of the suspension has been suctioned off and the electrolyte layer so formed is already relatively dry. Now air is slowly admitted and the substrate with the layer disposed thereon can then be carefully removed. For this purpose, the clamping ring, the silicon rubber seal and the silicon mask are removed and the coated substrate is carefully transferred onto a plexiglas support plate.

The drying of the electrolyte layer is unproblematic. It occurs under air at room temperature. Sintering is even possible before the layer is dried without causing crack formation in the layer. Generally, the samples are dried over night at room temperature. During this process, they are stored on a plexiglas support plate in a plexiglas container whose cover is opened only by a small gap. After a drying period of about 24 hours, the substrates with the layers thereon are weighed.

The anode substrates with the electrolyte layers disposed thereon are finally sintered in air at 1400° C. The oven has six support levels on each of which four anode substrates with layers thereon are disposed on plane-ground SiC plates. The sintering procedure is performed in accordance with the following schedule:

Heating up to 1400° C. at a rate of 1° K./min.

Maintaining the temperature at 1400° C. for 5 hours.

Cooling from 1400° C. down to room temperature at a rate of 5° K./min.

What is claimed is:

1. A method of producing an electrode comprising the steps of: providing a porous substrate including pores of a given size, pouring onto said substrate a suspension including coarse solids having a diameter of such a size that the solids at least partially enter said pores whereby the pores of said porous substrate are clogged when said suspension is applied to said substrate, and including also fine solids which are not larger than $1/5$ of said coarse solids and which clog any remaining pores, and drying and sintering said substrate with said suspension disposed thereon, thereby forming on said porous substrate a dense gas-tight electrolyte layer, which is firmly interlocked with said porous substrate.

2. A method according to claim 1, wherein said fine solids have a size of $1/8$ to $1/12$ of said solids which clog said pores.

3. A method according to claim 1, wherein a vacuum is generated on the side of said substrate opposite the side onto which said suspension is disposed during and after the suspension is poured onto said substrate.

4. A method according to claim 1, wherein the solids content of said suspension is selected, based on the substrate surface area such that the thickness of the layer produced on the substrate is between $1/2$ and 200 $\mu$m.

5. A method according to claim 4, wherein the solids content of said suspension is so selected that the layer produced on the substrate has a thickness of 1 to 50 $\mu$m.

6. A method according to claim 1, wherein the maximum diameter of the coarse solids in the suspension is at least as large as the minimum pore size in said substrate.

* * * * *